United States Patent [19]

Mosser et al.

[11] Patent Number: 4,659,613

[45] Date of Patent: Apr. 21, 1987

[54] PARTS COATED WITH THICK COATING COMPOSITIONS OF UNI- AND POLYMODAL TYPES

[75] Inventors: Mark F. Mosser, Sellersville; Bruce G. McMordie, Philadelphia, both of Pa.

[73] Assignee: Sermatech International, Inc., Limerick, Pa.

[21] Appl. No.: 802,827

[22] Filed: Feb. 10, 1986

Related U.S. Application Data

[62] Division of Ser. No. 566,514, Dec. 29, 1983, Pat. No. 4,617,056.

[51] Int. Cl.[4] .......................... B32B 7/02; B32B 5/16; C09D 5/10

[52] U.S. Cl. ..................... 428/215; 106/1.12; 106/1.25; 106/14.12; 148/6.15 R; 148/6.16; 148/6.27; 428/216; 428/323; 428/328; 428/332; 428/689; 428/697

[58] Field of Search ............ 106/1, 14.12, 1.12, 106/1.25; 148/6.16, 6.15 R, 6.27; 428/323, 328, 332, 215, 689, 697

[56] References Cited

U.S. PATENT DOCUMENTS

| | | | |
|---|---|---|---|
| 3,248,251 | 4/1966 | Allen | 106/1.12 X |
| 3,395,027 | 7/1968 | Klotz | 106/1 |
| 3,791,850 | 2/1974 | Deshay et al. | 148/6.15 R |
| 4,537,632 | 8/1985 | Mosser | 106/14.12 |
| 4,544,408 | 10/1985 | Mosser et al. | 106/14.12 |
| 4,548,646 | 10/1985 | Mosser et al. | 106/14.12 |

*Primary Examiner*—Thomas J. Herbert
*Attorney, Agent, or Firm*—Weiser & Stapler

[57] ABSTRACT

A coated metal or ceramic part having improved salt corrosion and oxidation resistance having a liquid binder which comprises phosphate ions and ions of the group of chromate or molybdate ions, and an atomized aluminum powder having an average particle size (as expressed in terms of the median equivalent spherical diameter ($\overline{ESD}$)), that is greater than at least 15 μm, and having a size distribution such that at least about 5% of the particles by weight are retained on a 325 mesh screen.

21 Claims, 12 Drawing Figures

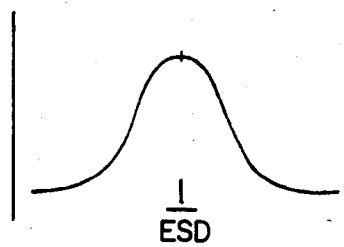
FIG.4a NORMAL
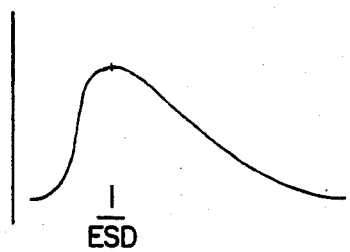
FIG.4b SKEWED

PARTS COATED WITH THICK COATING COMPOSITIONS OF UNI- AND POLYMODAL TYPES

This is a division, of application Ser. No. 566,514, filed Dec. 29, 1983, now U.S. Pat. No. 4,617,056.

This invention relates to a thick film aluminum-ceramic composite material which can replace thermal sprayed aluminum as an abradable or machinable, corrosion and oxidation resistant coating for metal and ceramic parts. The invention also relates to compositions suitable for making such coatings and to coated parts.

The coating compositions of this invention, in one embodiment, comprise a liquid binder, particularly an aqueous binder which comprises chromate and phosphate ions and a type of atomized aluminum powder with an average particle size greater than about 15 $\mu$m and having some population fraction greater than 44 microns in diameter (+325 mesh).

The invention also provides in another embodiment a coating of enhanced physical properties. This composition comprises aluminum powder with an average particle size of 15 $\mu$m, some fraction of which is +325 mesh, to which is added a quantity of a second grade of smaller aluminum powders possessing an average particle diameter about 0.5 or less that of the diameter of the larger grade. The cured film or coating of this composition has improved density and bond strength. The aluminum-filled slurry so described will, when thermally cured, produce an aluminum coating possessing adhesion, corrosion resistance and oxidation resistance that are superior to those of a thermal sprayed aluminum coating.

Whenever in this description of the invention the term "aluminum" is used in describing the powder, it is used to describe a preferred metal, and throughout the description there is intended to include metal powders in general, preferably aluminum.

For convenience in the description of the invention the compositions (and coatings) which comprise one type (or grade) of metal powder of the larger size, as described above, as designated as unimodal; the compositions (and coatings) which comprise also the second type (or grade) of smaller metal powder, designated as poly- or bimodal.

The term "thermal spray" has been used to describe any process whereby a material is brought to its melting point and sprayed onto a surface to produce a coating. These processes now include: (1) Metallizing or Wire Spray; (2) Arc Wire Spray; (3) Thermo Spray; and (4) Plasma Flame Spray.

The terms "metallizing" or "wire spray" are used to describe a type of thermal spraying process which involves the use of metal in wire form. The wire is drawn through the gun and nozzle by a pair of powered feed rollers. Here the wire is continually melted in an oxygen-fuel-gas flame and atomized by a compressed air blast which carries the metal particles to the previously prepared surface. The individual particles mesh to produce a coating of the desired metal. This meshing action is still not completely understood, but the effect is apparently due to a combination of mechanical interlocking and cementation of the oxides formed during the passage of the particles from the gun nozzle to the sprayed surface.

In the "arc wire spray" process, metal is melted by an electric arc, which is produced by passing current through two converging metal wires, before being atomized in compressed air. Metallizing and arc wire spray are suitable for producing coatings from any material that can be drawn into wire form.

Materials that cannot be produced in wire form are sprayed using "thermo spray" and "plasma flame spray" processes which utilize metals and other materials in powder form. In the "thermo spray" process, these powdered materials are held in a hopper atop the gun and gravity fed into the gun proper where they are picked up by the oxy-acetylene (or hydrogen) gas mixtures and carried to the gun nozzle. Here they are melted almost instantly due to the extremely high thermal efficiency of the gun and carried to the surface being sprayed by means of a siphon-jet arrangement at the gun nozzle. This also contributes to the thermal efficiency of the thermo spray process. Very high deposit efficiencies can be attained (usually well above 90%).

In plasma flame spraying, powders are melted in a plasma instead of an oxy-acetylene flame. The spray gun utilizes an electric arc contained within a water cooled jacket. An inert gas, passed through the arc, is excited to temperatures approaching 30,000° F. This plasma instantly melts any powder, even refractory materials, as it passes through the gun. These processes are more completely described in a pamphlet entitled "The METCO Flame Spray Process", available from METCO Inc., Westbury, N.Y., which is incorporated herein by reference.

Thermal-sprayed aluminum coatings can be applied by any of the four methods described above and are used to restore dimensional tolerances on a metal part or to improve its corrosion and oxidation resistance. For example, the internal surfaces of a cast aluminum diesel engine turbocharger inlet housing are repaired and recontoured using aluminum or aluminum alloy coatings. Approximately 0.045 inches (1.14 mm) of aluminum is thermo sprayed inside the housing, then the part is remachined to original tolerances. This repair is described in detail in the METCO Application Bulletin No. 403, which is incorporated herein by reference.

In another application, 0.003 to 0.010 inches (0.08 to 0.25 mm) of wire or arc wire sprayed aluminum is used by the U.S. Navy to prevent shipboard corrosion of steel structures. The pure aluminum coating provides sacrificial protection to the steel and can be painted to match other hardware. This protective system is described in the Corrosion Control Manual for DD-963 Class (NAVSEA S9630-AB-MAN-010), which is incorporated herein by reference.

The oxidation resistance and machinability of thermal sprayed aluminum coatings also make them uniquely suitable as air seals in aircraft turbine engines. In the axial compressor section of the turbine, intake air is accelerated and compressed by the action of thousands of spinning blades. It is essential for efficiency that the air passing through the compressor not be able to slip by the blades through spaces between the blade tips and the inside wall of the compressor case, or slip through spaces between the individual stages (rows) of blades. Air loss at blade tips has been eliminated in General Electric's CF-6 engine series by applying about 0.020 inches (0.51 mm) of aluminum on the inside of the case. The spinning blades gouge or abrade a groove in this plasma flame sprayed coating producing a tight seal between the blade tip and case wall. Other materials, such as fibrous metal felts or honeycombs, which are strong and adherent while offering little resistance to the cutting action of the blades, could be used. However, this aluminum seal is relatively inexpensive and is stable at temperatures as high as the 900° F. achieved in some later compressor stages. This application of plasma flame sprayed coatings is detailed in GE Specifications B50TF56 and B50TF57, which are incorporated herein by reference.

There are, however, some inherent limitations in thermal sprayed aluminum coatings which can adversely affect their performance in any application. Firstly, coatings which are less than about 0.005 inches (0.13 mm) thick are porous enough to allow moisture to reach the coating-substrate interface. This is highly undesirable and adversely affects the properties of the coatings. Research conducted by the U.S. Navy demonstrated that, on carbon steel, wire sprayed aluminum coatings that were 0.004 inches (0.10 mm) thick exhibited poor corrosion resistance in salt spray tests because the porosity of the thin coatings accelerated the sacrificial reaction of the aluminum. These findings were published in the technical manual, *External Preservation of Steam Valves using Wire Spray Aluminum* (NAVSEA S6435-AE-MAN- 010/W SPRAYED CTT or NAVAIR 50-20-1), which is included herein by reference. As a consequence of this study, the Navy requires that all thermal sprayed aluminum, corrosion resistant coatings be applied at least 0.005 inches (0.13 mm) thick (cf. Corrosion Control Manual referenced above).

Secondly, the bond at the thermal sprayed coating/substrate interface is so sensitive to the condition or characteristics of that interface that it is often difficult to assure good adhesion of the coating to a part. In order to produce a well-bonded coating, the metal or ceramic surface must be clean and rough. A clean surface is one free of dirt, oil, moisture and all other contamination. Even the transparent oxide film that forms on a steel part at room temperature is enough to prevent adhesion of the thermal sprayed coating. Therefore, the U.S. Navy Corrosion Control Manual cited above requires that any surface not coated within two hours after blasting must be blasted again before it is coated. As might be expected, the size and severity of the blast profile also affects the tensile bond strength of the coating. Moreover, the temperature of the substrate can be of great consequence. It has been demonstrated that a thermal sprayed coating will adhere much better to a steel part that has been preheated to about 500° F. than to one that is at room temperature.

In addition to problems associated with the conditions at the interface, the application of thermal sprayed aluminum is complicated by the fact that the aluminum particles adhere to one another much better than they adhere to the properly prepared substrate. The moment the molten aluminum droplet comes in contact with air, an oxide crust forms on its surface. These oxide films bond very well to one another but do not adhere well to other materials. The disparity in the adhesive and cohesive strength of thermal sprayed aluminum, which is shown below in Table 1, is so large that internal stresses can actually cause disbonding or peeling of thick coatings. Consequently, the U.S. Navy Manual cited above requires that no wire-sprayed aluminum coating used aboard ship should exceed 0.010 inch (0.25 mm) in thickness. In fact, in those applications, such as the turbocharger inlet housing and aircraft engine case described above, in which the coating is machined or abraded later, the parts are first sprayed with a special nickel- or molybdenum-alloy bond coat to ensure that the thermal sprayed aluminum will not disbond or peel off the part. The dependency of bond strength upon the condition of the metal substrate and the benefit of a bond coat are demonstrated in Table 1 below.

TABLE 1

| Mechanical Properties of Wire Sprayed Aluminum Coatings | | | |
|---|---|---|---|
| Surface Condition | Tensile Strength | Tensile Bond Strength | Shear Bond Strength |
| 90 mesh grit blast | 19,500 psi | 1,032 psi | 2,830 psi |
| 20 mesh iron grit blast, warmed to 400° F. | 19,500 | 2,142 | 4,500 |
| smooth surface, Mo bond coat | 19,500 | 1,640 | 4,400 |
| 24 pitch thread, Mo bond coat | 19,500 | 2,400 | 5,500 |

Ref.: The METCO Flame Spray Process, METCO Inc., Westbury, NY

Like thermal sprayed aluminum, aluminum-filled chromate/phosphate coatings of the type described in U.S. Pat. No. 3,248,251 ('251 Allen) are durable, malleable, corrosion and oxidation resistant films. Unlike the thermal sprayed coatings these heat cured aluminum-ceramic coatings bond very well to steels and other metallic substrates and will greatly extend part life in hot saline environments. Example 7 of '251 Allen, for instance, has a tensile bond strength in excess of 10,000 psi on steel and will provide sacrificial corrosion protection at temperatures as high as 1150° F. Consequently, aluminum chromate/phosphate coatings have been specified on aircraft engine parts, automotive exhausts, shipboard steam handling systems, assorted fasteners, and much more.

The compositions described in '251 Allen comprise aluminum powders that average 5-10 microns in size. As such, the coatings of that patent cannot generally be applied at thickness greater than about 0.0015 inch (0.04 mm) per cure without significant loss of performance. Furthermore, coatings as thick as 0.01 inches (0.25 mm) or more, produced by applying multiple thin coats of these materials, have very poor bond strengths.

Heretofore, these limitations have excluded metal filled, e.g. aluminum-filled, chromate/phosphate coatings from most of the applications where thermal sprayed aluminum is used, such as those described above.

The invention described herein provides a tightly adherent, corrosion and oxidation resistant metal, e.g. aluminum, chromate/phosphate coatings that are as thick as 0.100 inch (2.54 mm) or more and that can be applied at 0.003-0.030 inch (0.08-0.76 mm) per cure. These coatings comprise an aqueous acidic binder, comprising metal chromate, dichromate, or molybdate ions and phosphate ions, which comprises metal powders, like aluminum metal powders, some having an average particle size of at least 15 $\mu$m, of which, preferably at least 5% by weight, are greater than 44 microns in diameter (+325 mesh).

The size distribution of metal particles, e.g. aluminum particles, incorporated into the coating of this invention may be produced by using one or more grades (or types) of powder. However, should two grades of powder be combined to produce the distribution, the average diameter of the smaller grade should be at least less than about one-half, preferably less than about one-tenth, the average particle size of the larger powder grade, and the relative weight ratio of large to small metal, e.g. aluminum, powders should be preferably about 4 to 1. Coatings of this invention, containing two powders of differing sizes, in accordance with the criterion described herein are referred to as bimodal coatings and are denser, more adherent, and more corrosion resistant than those produced using a single large grade of powder alone. Such coatings have been referred to as unimodal compositions.

BRIEF DESCRIPTION OF THE DRAWINGS

FIG. 4(a) shows a normal particle size distribution curve.

Figure 1:
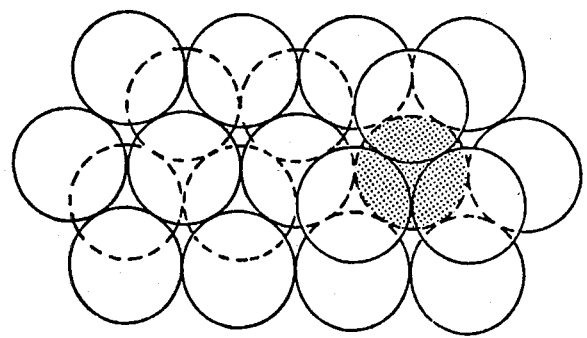
FIG. 1 illustrates the densert arrangement of the particle spheres.

For a better understanding how particle size and shape can affect the density of a thick particulate-filled coating, it is helpful to construct an idealized model of the coating in which the powder particles are represented as identical spheres. The densest arrangement of these spheres is one in which each sphere has twelve neighbors, six surrounding its equator, three on the plane above, and three below as illustrated in FIG. 1. Even in this configuration, the spheres occupy only 74% of the volume of the structure. The spaces between the spheres constitute the remaining 26% of the volume.

If the idealized coating layer is constituted of four layers of spheres, stacked one on top of the other in the close-packed manner of FIG. 1, then obviously the easiest means of producing a thicker coating is to increase the diameter of the spheres. However, as the size of the spheres increases, so also does the size of each void, though the volume fraction of space in the structure remains constant.

The size of these interstitial voids is especially important in a composite coating such as an aluminum-filled chromate/phosphate material. When the particles are small, as is the case in the coatings of '251 Allen in which the aluminum pigments were all much less than 44 microns in diameter (−325 mesh), the voids in the coating are very small and the liquid binder fills and seals these spaces to form a dense composite film. As the particle size increases, the voids eventually become so large that the binder (which shrinks as it cures) cannot fill and seal them. At this point, the apparent density of the coating changes dramatically. The coating, which had been a composite of small aluminum particles with chromate/phosphate binder filling the interstices between the aluminum, then becomes a composite of large, chromate/phosphate coated aluminum particles, interspersed with voids and open pores.

It has been observed in the study and work done in conjunction with the development of this invention that coatings made with atomized powders that are greater than about 20 microns in diameter are more porous than desired, with the adverse consequences described above. It has also been discovered that when the voids between powder particles in the coatings are so large that the binder cannot fill them, they are also large enough to accomodate another suitably sized smaller particle.

Figure 2A:
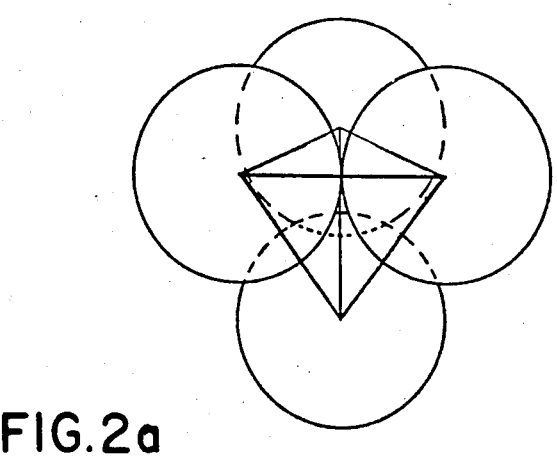
FIG. 2 illustrates the geometrical relationship derived between the radius of the particles and the size of the interstices.
Figure 2B:
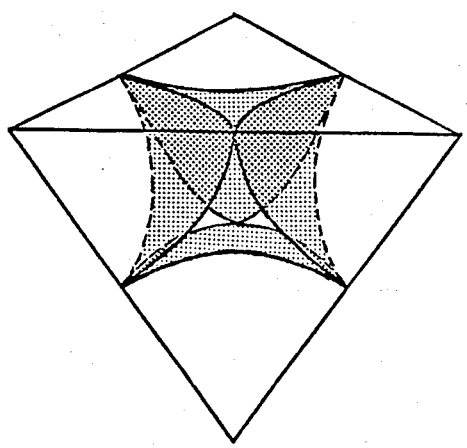
Figure 2C:
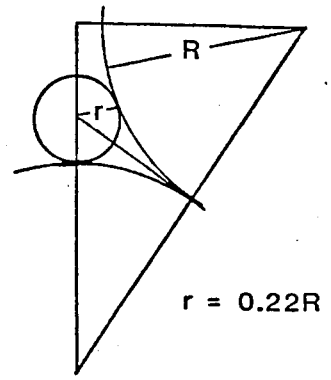
Figure 3A:
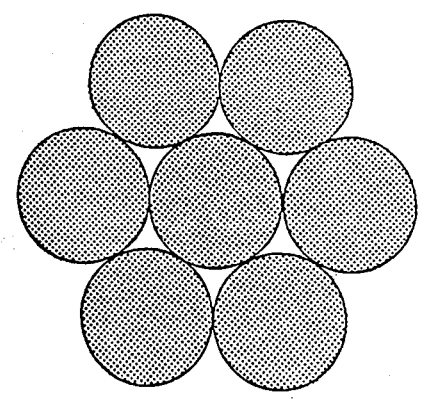
FIG. 3 shows the relationship of binder to particle when positioned in an interstice.
Figure 3B:
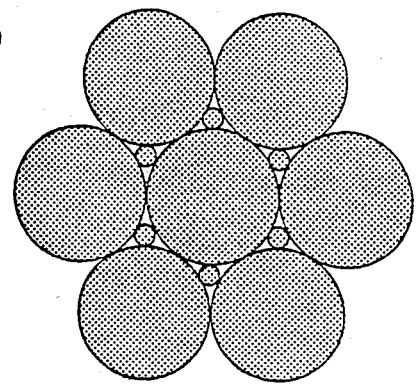

The geometrical relationships derived between the radius of the particles and the size of the interstices (FIG. 2) require that if a smaller particle (hereafter referred to as the secondary particle) is to fit into the void without distorting the packing of the larger spheres (hereafter referred to as the primary particles), its radius should be no greater than 0.22 times the radius of the larger sphere (i.e., r=0.22R). Such a particle, when positioned in an interstice, markedly reduces the volume of space that the binder has to fill (FIG. 3). However, these considerations are based upon a model which assumes that each powder particle is perfectly spherical and that each grade of powder consists of only one size of particle. In reality, commercially available atomized aluminum powders, especially the more common air-atomized ones, are not very spherical and comprise a wide range of particle sizes.

This reality has called for additional features for the practice and manufacturing of the compositions of the invention, as described further below.

Air-atomized grades of aluminum powder are produced by aspirating molten metal through a nozzle into a supersonic stream of air. The lower end of the nozzle dips into the bath of molten metal and its upper end terminates in a small orifice. When a jet of air is passed over the orifice of the nozzle it creates a suction effect, aspirating the liquid metal through the nozzle, into the airstream and disintegrating the molten stream into small, discrete particles. When the stream of liquid aluminum is broken into individual droplets by the jet of air, each droplet is initially flattened and elongated by the force of the gas stream. Under ideal conditions, these droplets would rapidly contract into a spherical shape in order to minimize surface area and surface energy. However, when the molten aluminum contacts the air, a hard, dense oxide film immediately forms on the surface of the liquid drop. This oxide shell causes the droplet to solidify in its initial distorted shape. Consequently, air-atomized aluminum powder particles are irregular in shape and generally the smaller the particle, the greater its variance from the perfectly spherical shape.

Special spherical grades of atomized aluminum are also commercially available, though they are much more expensive than air-atomized material. These spherical powders were developed for use in explosives and rocket propellants where precise control of surface area is essential for control of reaction rates. Spherical powders are produced by aspirating molten aluminum into a jet of a reducing gas, such as hydrogen or an exothermic mixture of combusted methane, or an inert gas, such as helium or nitrogen. These protective atmospheres prevent oxidation of the molten metal surface so that the metal droplet can relax into its equilibrium, spheriodal shape. These grades of gas-atomized aluminum are referred to as "spherical" powders although they never actually achieve perfect sphericity because of the effect of gravity on the molten metal droplet.

Air-atomized and non-oxidizing gas-atomized powders are typically characterized according to one of the following measured parameters: particle size or average particle diameter, particle size distribution, and particle shape or configuration. Particle size, the parameter most commonly used to distinguish grades of powder, is generally synonymous with particle diameter; however, particle diameter can only be determined accurately for spherical powders.

The average diameter of particles in any given powder grade is typically measured using the Fisher Sub Sieve Sizer (ASTM B330). This device measures the resistance to air flow through a packed column of powder relative to the resistance to flow through a packed bed of spherical particles of known average diameter. The advantage of this technique is that it is simple, fast and economical. However, because the process measures a bulk (column) property rather than monitoring individual particles, the average particle diameter determined by the Fisher Sub Sieve Sizer (FSSS) is actually a statistical average rather than a true particle size.

Since actual atomized powder particles rarely exhibit a perfect spherical shape (for reasons mentioned above), the particle size is most usefully established by measuring a characteristic property of an irregular particle that can be related to the same property of an ideal regularly shaped particle. By choosing a sphere as the ideal shape, the size of both air- and non-oxidizing gas-atomized powders can be reliably described as "equivalent to a sphere of diameter (d)," thereby combining the parameters of size and shape in a single variable. An unequivocal, reproducible particle size having one dimension is thus established with this definition.

The equivalent spherical diameters (ESD) of aluminum or other metal particles in a particular grade of powder are measured by automated sedimentation equipment such as the Micromeritic SediGraph 5000 E particle size analyzer. This device uses low energy X-rays to determine the concentration of particles at various depths in a column of known fluid. The laws of hydrodynamics require that the settling rate of a particle in the fluid is related to the mass of the particle. The Sedi-Graph determines the population of particles of a particular mass in the powder grade by measuring the density of particles at a given level within the fluid. Since the diameter of an ideal spherical particle is related to its mass by means of its density and volume (i.e. diameter), each density measurement in the Sedi-Graph corresponds to a population count of particles with a mass that is equivalent to that of a spherical particle having a diameter, d (designated ESD). Therefore, grades of atomized powders are completely characterized by the population size distribution measured by the sedimentation technique and the average ESD ($\overline{ESD}$) corresponding to the median value in the distribution.

In accordance with this invention, both air- and non-oxidizing gas-atomized aluminum powders are described using equivalent spherical diameter (ESD) measurements provided by sedimentation equipment. Additional information regarding analytical test methods for characterizing aluminum powders is provided in the Alcoa pamphlet section PAP917 (FA2D-2) entitled "Quality Control and Analytical Test Methods for Alcoa Aluminum Powders". For additional information about automated sedimentation measurements, see the pamphlet entitled "A Short Course in Fine Particle Technology" provided by Micromeritics Instrument Corporation. These documents are incorporated herein by reference.

Particle size distributions for three commercially available grades of aluminum powder are shown in Table 2 below, expressed in terms of equivalent spherical diameters. Each grade contains a substantial portion of particles which are larger than 44 microns in diameter and the $\overline{ESD}$ of each is greater than 15 $\mu$m which is large enough to ensure that coatings made with these grades can be applied in thicknesses of 0.003 inches (0.08 mm) or more per cure. Grades A and C correspond to grades X-81 and X-75 spherical aluminum powders from Alcan Aluminum Corp., Elizabeth, N.J. These powders are produced by atomizing aluminum into a reducing mixture of $N_2$, $H_2$, CO and $CH_4$. Grade B is Alcan's MD101 grade of air-atomized powder.

TABLE 2

| Commercially Available Aluminum Powder | | | |
|---|---|---|---|
| ESD Distribution | A | B | C |
| 10% less than | 8.3 $\mu$m | 13 $\mu$m | 12.1 $\mu$m |
| $\overline{ESD}$ (50%) | 23.7 | 36 | 38.1 |
| 90% less than | 59.8 | 88 | 89.7 |
| ave. particle dia. (FSSS) | 12-18 $\mu$m | 14-22 $\mu$m | 16-24 $\mu$m |

Each of the grades of aluminum powder shown in Table 2 exhibits either a normal or skewed particle size distribution curve (FIG. 4). These distribution curves possess a single maximum frequency called a "mode" and are, therefore, termed unimodal distributions. The sums of any two or more of these powder grades also produce a unimodal distribution. Consequently, the coatings of this invention which comprise one or more of these coarser grades are herein referred to as unimodal coatings, as was already referred to above.

In unimodal coatings of this invention, the $\overline{ESD}$ of the grade of the aluminum used shall preferably exceed at least 15 $\mu$m, more preferably 25 $\mu$m. Furthermore, the quantity of powder exceeding 44 $\mu$m in diameter, that is that percentage greater than 325 mesh, shall preferably be at least 5% by weight.

It is to be further noted that the density of a particulate-filled coating is increased when the interstices between large particles are filled with properly sized, smaller particles. To a limited extent this denser packing may exist in unimodal coatings due to the wide range of particle sizes present in commercial powder grades. In grade A above, for example, about 15% by weight of the aluminum particles are greater than 50 $\mu$m in diameter and about 12% of the particles are less than the corresponding maximum interstitial size of 11 $\mu$m (0.22×50 $\mu$m). Consequently, in a coating comprising Grade A powder only, there may exist more densely packed regions in which small particles occupy interstices between close packed larger ones. Densification of the coating layer can increase its corrosion resistance and bond strength; however, in unimodal coatings this effect is localized and limited because a preponderance of particles in the coating do not share a similar ideal size relationship. In fact, when less than about 5 weight percent of the atomized powders are greater than 44 $\mu$m in diameter (i.e. greater than 325 mesh) even the localized densification effect becomes negligible.

Another embodiment of the invention is a composition (and resulting coating) which comprises a powder of a second, smaller particle. This powder effectively fills the interstitial voids.

In such compositions, virtually all the voids between the large particles are nearly filled with smaller particles. Four fine grades of aluminum powder are described in Table 3 which are suitable secondary powders for increasing the density of coating compositions of the invention in the manner. Grades a, b and d are spherical-atomized powders. Grades a and b correspond to grades H-3 and H-5 helium atomized powders from Valimet Inc., Stockton, Calif. Grade d is Alcan's X-65 reducing gas-atomized aluminum. Grade c is LSA-693 air-atomized powder from Reynolds Metal Co., Louisville, Ky.

TABLE 3

| | Secondary Aluminum Powders | | | |
|---|---|---|---|---|
| ESD Distribution | a | b | c | d |
| 10% less than | 1.7 μm | 2.1 μm | 2.6 μm | 4.1 μm |
| $\overline{ESD}$ (50%) | 3.2 | 3.9 | 5.5 | 8.9 |
| 90% less than | 6.6 | 8.0 | 10.4 | 16.1 |
| ave. particle dia. (FSSS) | 3-4.5 μm | 4.5-7 μm | 6-9 μm | 4.5-9 μm |

When in accordance with the invention, a coarser, primary powder (such as those in Table 2), is mixed with a finer, secondary powder (such as those in Table 3), the powder which results possesses two peak frequencies or modes in its particle size distribution curve. Such a distribution is termed a bimodal distribution. Therefore, the coatings of this invention which contain both small and large grades of aluminum powder are herein referred to as bimodal coatings.

In an idealized model, the maximum allowable ratio of secondary diameter to primary diameter is 0.22. The size relationships in the twelve possible combinations of powders from Tables 2 and 3 are listed in the following tables (4, 5 and 6). In each table, the idealized maximum allowable size (i.e. 0.22 times the primary powder diameter) is listed as well as the size of each powder grade. Portions of the size distributions of secondary powders that are smaller than this idealized limit are asterisked.

ing technique is amplified in ASTM B527 which is incorporated herein by reference.

Figure 5:
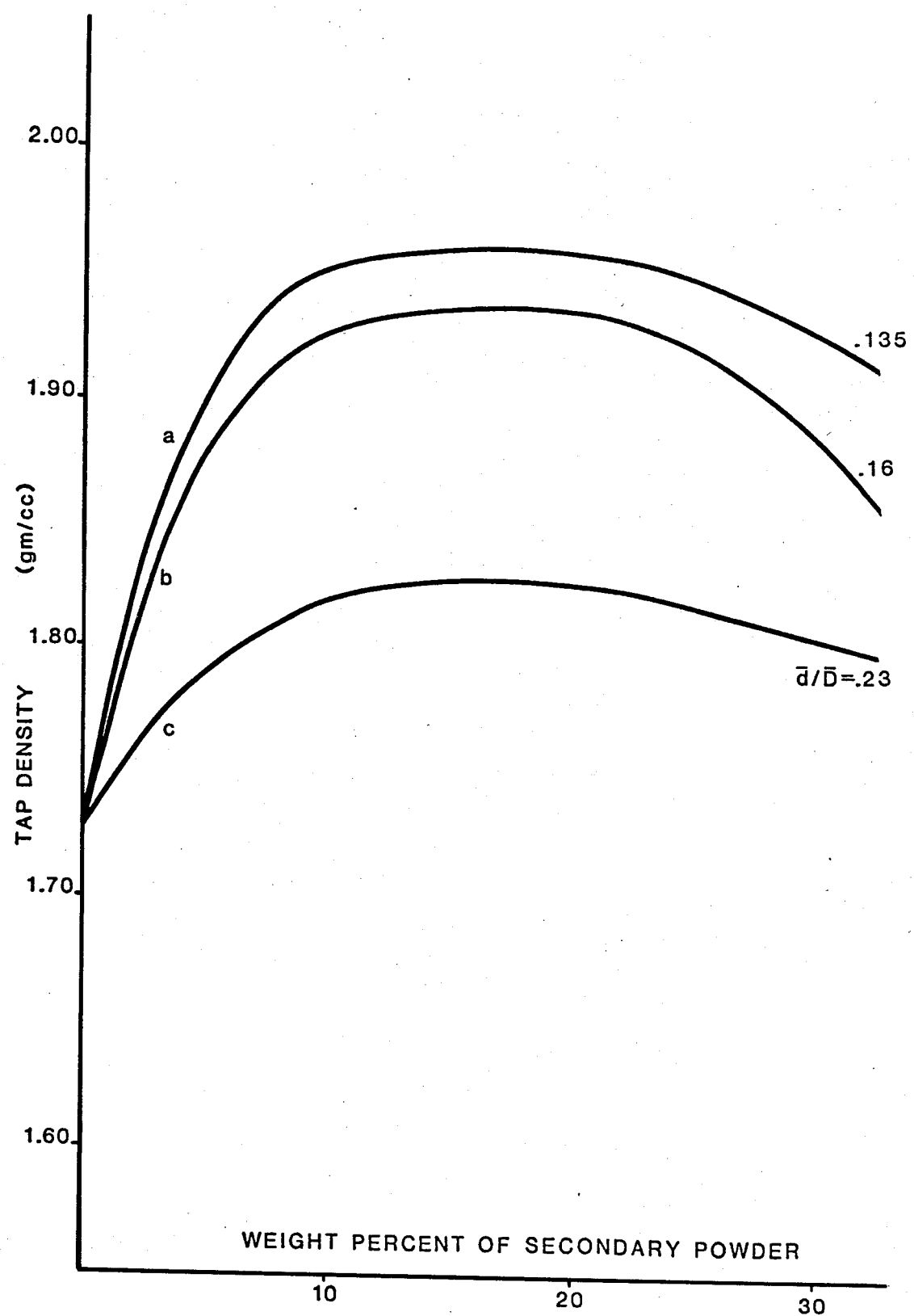
FIGS. 5, 6 and 7 represent tap densities for mixtures of the primary and secondary aluminum powders.
Figure 6:
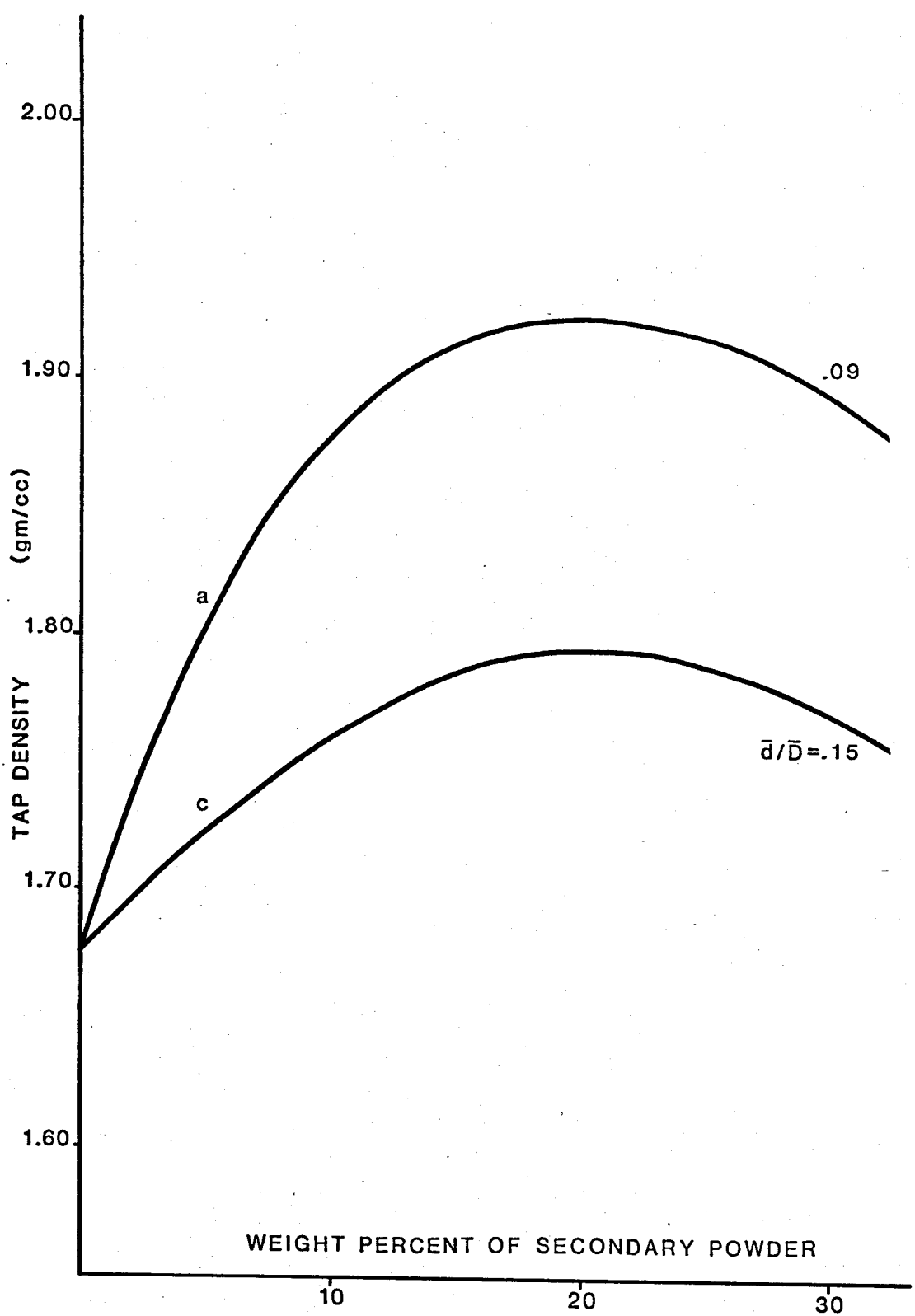
Figure 7:
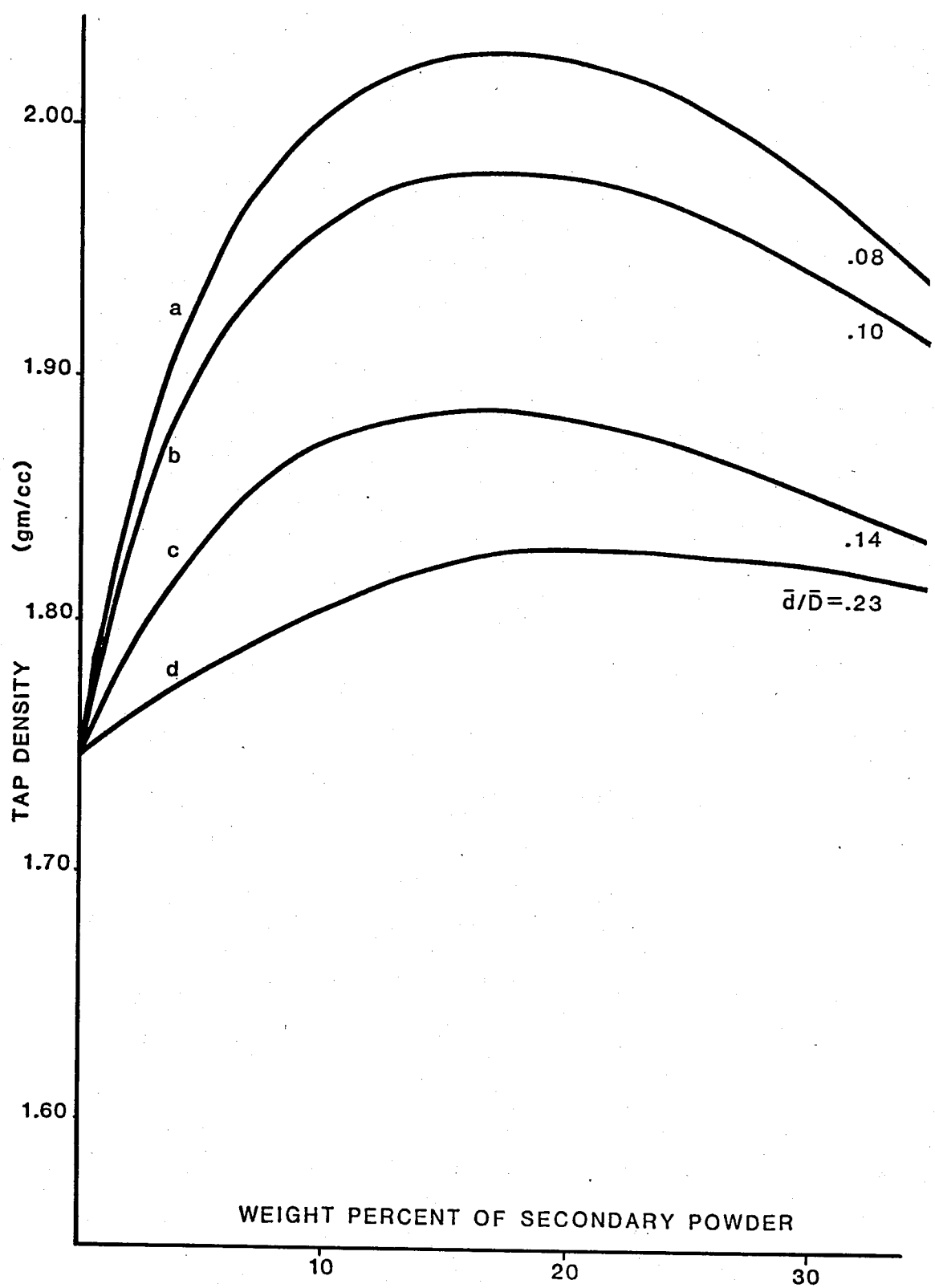

The tap densities determined for mixtures of the primary and secondary aluminum powders in the tables above are represented in FIGS. 5, 6 and 7. In each curve, the tap density is plotted against the weight percent of the secondary powder in the bimodal mixture. The ratio of the $\overline{ESD}$ of the secondary powder to the $\overline{ESD}$ of the primary powder (designated d/D) is noted beside each curve.

All of the curves exhibit the same characteristic shape with a single maximum and no other points of inflection. Furthermore, the density of the powder blends increases as the value of d/D decreases.

Figure 8:
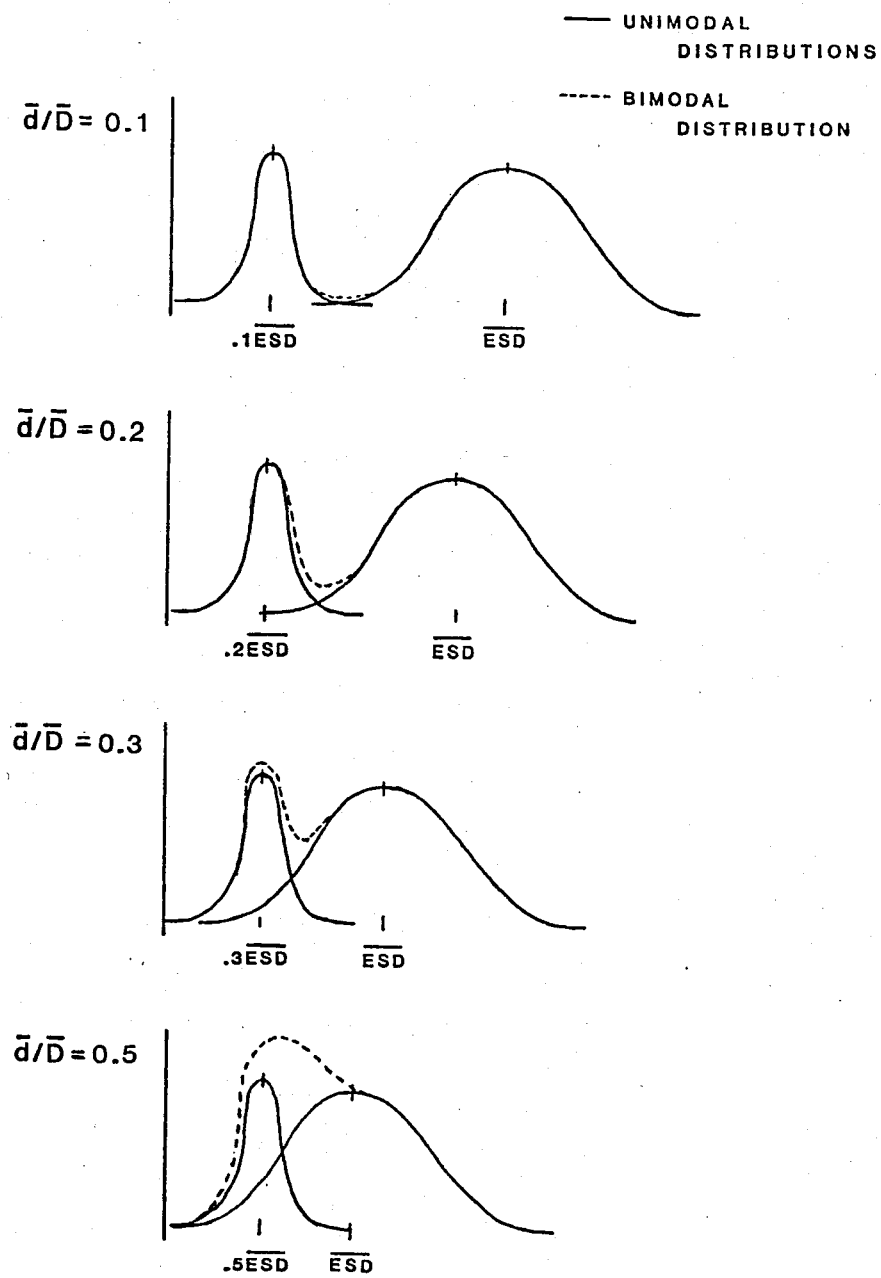
FIG. 8 shows the bimodal powder distributions in the coatings with increasing d/D ratio.

The reduction in tap density with increasing d/D ratio is a reflection of the nature of the bimodal distribution. As shown in FIG. 8, the bimodal powder distributions in the coatings of this invention are in fact the sum of two distributions, each having a single mode. As long as the population means of these two unimodal distributions are widely separated, the total distribution has two distinct modes and dense packing is possible. As the population means approach one another, the two peaks in the total particle size distribution become less distinct, fewer particles fit easily into interstices, and less densification is achieved. In the extreme, the two size distributions overlap so much that the total distribution begins to resemble the unimodal distribution of a single powder grade.

Consequently, in coatings of this invention containing grades of aluminum powder of very different sizes, the $\overline{ESD}$ of the primary powder (or powders) exceeds pref-

TABLE 4

| Comparison of Sizes of Secondary Powders Relative to Primary Powders A | | | | | | |
|---|---|---|---|---|---|---|
| ESD Distribution | A | ideal | a | b | c | d |
| 10% is less than | 8.3 μm | 1.8 μm | 1.7 μm* | 2.1 μm | 2.6 μm | 4.1 μm |
| $\overline{ESD}$ (50%) | 23.7 | 5.2 | 3.2* | 3.9* | 5.5 | 8.9 |
| 90% is less than | 59.3 | 13.0 | 6.6* | 8.0* | 10.4* | 16.1* |

TABLE 5

| Comparison of Sizes of Secondary Powders Relative to Primary Powder B | | | | | | |
|---|---|---|---|---|---|---|
| ESD Distribution | B | .22B | a | b | c | d |
| 10% is less than | 13 μm | 2.9 μm | 1.7 μm* | 2.1 μm* | 2.6 μm* | 4.1 μm |
| $\overline{ESD}$ (50%) | 36 | 7.9 | 3.2* | 3.9* | 5.5* | 8.9 |
| 90% is less than | 88 | 19.4 | 6.6* | 8.0* | 10.4* | 16.1* |

TABLE 6

| Comparison of Sizes of Secondary Powders Relative to Primary Powder C | | | | | | |
|---|---|---|---|---|---|---|
| ESD Distribution | C | .22C | a | b | c | d |
| 10% is less than | 12.1 μm | 2.7 μm | 1.7 μm* | 2.1 μm* | 2.6 μm* | 4.1 μm |
| $\overline{ESD}$ (50%) | 38.1 | 8.4 | 3.2* | 3.9* | 5.5* | 8.9 |
| 90% is less than | 89.7 | 19.7 | 6.6* | 8.0* | 10.4* | 16.1* |

The relative packing densities that are achievable in bimodal coatings containing blends of these powders can be estimated using a tap density test in which the powders are placed in a graduated cylinder which is then tapped or agitated to encourage the powders to settle into their densest arrangements. The tap density then is the mass of powder divided by the final volume that mass occupies in the cylinder and is expressed in terms of grams per cubic centimeter (gm/cc). This testerably 15 μm, more preferably 25 μm, and the ratio of the $\overline{ESD}$ of the smaller powder (or powders) to that of the larger one(s) is at least less than about 0.5, and preferably less than about 0.12. At least about 5% by weight of the primary powder is greater than 44 μm in diameter, and the weight percentage of smaller powder(s) in these bimodal coatings is preferably between about 5 and 50%, most preferably between 15 and 25%.

The powders which are used in the compositions of this invention in accordance with the constraints defined above may comprise either air- or spherical-atomized grades of aluminum. It is also within the scope of this invention that the suitably sized secondary powder be chosen from a wide range of metallic pigments, such as nickel, or refractories, such as SiC or glass, or even polymeric resins, such as acrylics or polyesters, instead of aluminum in order to incorporate other desirable properties into the coating film. Whenever the term "aluminum" is used herein, it is intended to include alloys of aluminum such as MgAl, AlZn or others that are known.

It is obvious to one skilled in the art that the preferred weight ratios of these secondary powders will be greater or less than those described above for aluminum, depending on the relative density of the material.

The advantage of the use of bimodal particle size distributions in compositions of this invention is clearly demonstrated when comparing the physical properties of several coatings which use a chromate/phosphate binder of the type described in '251 Allen and which are embodiments of this invention.

One embodiment is a unimodal coating comprising Grade C powder only. The second embodiment is a bimodal coating comprising powder Grades A and C (d/D=0.25) in an 80/20 weight ratio. The third coating, a preferred embodiment of this invention, contains a mixture of Grades C and a, which consist of 20% grade a by weight. The ratio of the $\overline{ESD}$'s for these two powders is 0.08. The weight of aluminum per unit weight of binder is constant for all the coatings and equal to that of Example 7 in '251 Allen.

The bond strengths of these three coatings are included in Table 7 with the bond strengths of the '251 Allen formulation which comprises small aluminum only ($\overline{ESD}$=6 μm). Although the unimodal coating exhibits much greater bond strengths than do thermal sprayed aluminum coatings, it is obvious that the addition of a secondary powder in the bimodal formulations causes a substantial improvement in the physical properties of the coating.

TABLE 7

| Comparison of Thick Aluminum-Ceramic Coatings | | | | |
|---|---|---|---|---|
| coating | thickness | no. of coats | tap density | bond strength |
| '251 Allen, ex. 7 | 2-3 mils | 2 | 1.4 gm/cc | 10,000+ psi |
| '251 Allen, ex. 7 | 18 | 13 | 1.4 | 1,700 |
| A + c | 10 | 2 | 1.795 | 7,500 |
| C | 12 | 3 | 1.746 | 5,800 |
| C + a | 13 | 3 | 2.028 | 9,800 |
| Thermal Spray Aluminum | 5-10 | 1 | — | 1,000-2,000 |

Since the critical component of this invention is the size and size distribution of the aluminum powders (or other metal powders) used in the compositions, e.g. the primary and/or secondary powders described herein, it will be appreciated that the particular nature of the binder portion of this invention (its ingredients and other variables) is of secondary importance, thus allowing a greater latitude in the selection (and proportions) of the other ingredients of the compositions for the coatings of the invention than permitted heretofore.

The compositions of the invention are constituted or made of aqueous solutions (or are solids as described hereinafter) of a combination of inorganic compounds from the group consisting of phosphoric acid, chromic acid, molybdic acid, and the metal salts of these acids. Preferred solutions contain phosphate anion and chromate (or dichromate) and/or molybdate anions. A great variety of such solutions are known for treatment of metal surfaces. For instance, Kirk and Othmer, Eds., *Encyclopedia of Chemical Technology*, 2nd ed., vol. 18, Interscience Publishers, a division of John Wiley & Sons, Inc., 1969 (pages 292-303), describes phosphate and chromate coatings. The United States patent literature describes coating solutions or dispersions for protective coating of metals, which compositions are suitable for use as components of the compositions of the invention. Such suitable compositions are disclosed by the Allen (U.S. Pat. No. 3,248,251); Brumbaugh (U.S. Pat. No. 3,869,293) patents referred to above; Collins (U.S. Pat. No. 3,248,249); Boies (U.S. Pat. No. 3,081,146); Romig (U.S. Pat. No. 2,245,609); Helwig (U.S. Pat. No. 3,967,984); Bennetch (U.S. Pat. No. 3,443,977); Hirst (U.S. Pat. No. 3,562,011) patents, and others. These disclosures are incorporated herein by reference. Other illustrative patents or literature showing corrosion inhibiting and protective coating compositions of phosphates, mixtures of phosphates and chromates and/or molybdates are known to one skilled in the art and further examples need not be supplied.

In the binder of the chromate/phosphate composition used it is not necessary that a metal ion be added. When the phosphate and/or chromate or molybdate ion is furnished to the solution by addition of a metal salt, as is often done, metal ion is inherently supplied to the solution. Hence, any of the known phosphates, chromates, dichromates or molybdates can be used as the source of metal ion. Additionally, as is known, metal ion can be supplied in a form such as metal oxide, hydroxide, carbonate, etc. which will dissolve in acid, i.e. phosphoric acid, chromic acid or molybdic acid, to produce the metal phosphate, chromate or molybdate, and therefore the metal ion, plus water and/or gas which is evolved. The following metal compounds will illustrate those which can be added to generate the metal ion within the solution, by an acid-base reaction, in accordance with the above: magnesium oxide; magnesium hydroxide; zinc oxide; zinc hydroxide; aluminum hydroxide; lithium oxide; lithium carbonate; and calcium hydroxide. Metal compounds which may be added to generate the metal ion in solution are various oxides, hydroxides or carbonates of magnesium, zinc aluminum or others. Such procedures and sources for the metal ions are known and reference may be made to the cited '251 Allen patent, for instance, column 7, lines 26-57, which is incorporated herein by reference.

In the coatings of the inventions, which by definition contain large aluminum particles, it is advantageous, though not necessary, to use thixotropic chromate/phosphate binders. The high viscosity of these binders helps to hold the larger metal pigments in suspension, making the coating more uniform and easier to apply. Thixotropic acidic binders of this type may be produced by incorporating certain colloidal aluminas into the chromate/phosphate solution, as disclosed in the copending application Ser. No. 485,748, filed Apr. 18, 1983 now U.S. Pat. No. 4,544,408, which is incorporated herein by reference. Alternatively, the binder may be thickened by additions of certain amorphous silicas and a nonionic surfactant. Such suitable additives and compositions are disclosed in the copending application Ser. No. 441,754, filed Nov. 15, 1982 now U.S. Pat. No. 4,548,646, which is incorporated herein by reference.

The pH of the aqueous chromate/phosphate binder used herein is preferably, but not necessarily, in the range of about 0 to about 3.0, preferably in the range of about 1.5 to about 2.5.

It is envisioned by this invention that other binders may be used to produce the thick metal-filled films. These include synthetic organic binders such as silicones and phenolic resins and inorganic glasses such as borates and other frits.

Other variations to constitute the compositions of the invention are contemplated by the invention and can be made by one skilled in the art.

Although the principal interest is in the coating of metal parts, it is evident that non-metal parts such as ceramics, and other substrates can be coated also. The coating can also be applied to any ferrous (iron) or non-ferrous metal or alloy (aluminum, zinc, brass, nickel) which can withstand the temperature required to cure the binder used in the coating composition.

The coating compositions of this invention, therefore, comprise a liquid binder, particularly an aqueous binder containing chromate and phosphate ions, which comprise atomized aluminum powder such that the average particle diameter as expressed in terms of the equivalent spherical diameter is greater than at least 15 $\mu$m, preferably greater than 25 $\mu$m, and at least about 5% by weight, preferably about 15%, of the particles in the size distribution are retained on a 325 mesh screen, which is to say that they are greater than 44 $\mu$m in diameter. The particle size distribution may be produced by incorporating one, or more, grades of atomized powder, each having an average ESD ($\overline{ESD}$) greater than at least 15 $\mu$m and each containing at least 5 weight percent of particles that are +325 mesh. Such grades, either singly or in combination, yield a particle size distribution curve with a single maximum or mode, which conforms to the constraints of the invention as described above.

Alternatively, powders of very different sizes may be combined in a single composition of the invention, such that the resultant particle size distribution curve has two peak frequencies or modes. In coatings of the invention possessing such bimodal particle size distribution curves, it is the ESD of the larger (primary) powder(s) only that is called to exceed preferably at least about 15 $\mu$m, more preferably 25 $\mu$m, and the ratio of the $\overline{ESD}$ of the smaller powder to that of the larger one is preferably at least less than about 0.5, more preferably less than about 0.12. Also, preferably at least about 5% by weight of the primary powder, more preferably 15% or more, shall be retained on a 325 mesh screen. The amount of smaller (secondary) powder(s) is preferably less than about 50% by weight and more preferably ranges between 15 and 25 weight percent.

Another embodiment of the invention provides non-aqueous, virtually dry compositions, generally, of a powder-like physical appearance and nature. These compositions comprise the metal, e.g. aluminum powders described herein and a binder, such as are described herein, which is substantially free of water. Such a binder material may be obtained for instance by removing the aqueous phase (as by spray-drying or other convenient methods from the aqueous binder) or making one without the aqueous phase and admixing all or part of the aluminum powder with the other solid materials. All or part of the dry mixture without the aluminum powder may be ball milled to a desired particle size. The aluminum powders may be admixed with any or all of the non-aqueous components and the aqueous component admixed in part or all of it to form the final or intermediate product. These compositions contain ideally all the necessary solids, i.e. powdery components including the aluminum powders. The aluminum powder can also be admixed to the other components in part or all of it before use. In the bimodal type, either one of the aluminum powder (or other metal powder) may be admixed at any appropriate time. The aqueous composition with all (or a portion of the aluminum powder if not all of it had been already incorporated) may then be added, then the liquid portion (all or partly) removed, as by spray-drying. The resulting composition is a dry, crumb-like material. This material may be reconstituted or brought to a desired consistency when desired. Thus, these steps (admixing or removing) a component can be performed in any sequence which is desirable to achieve the objective intended. Such non-aqueous compositions are particularly well suited for transporting from one location to or closer to the location where the coating composition is intended to be applied, at which time the aqueous phase will be added together with further aluminum powder, if desired. Also, concentrates, i.e. with a high solids content, of the liquid compositions of the invention can likewise be prepared.

The different components of the blends may be mixed to the compositions contemplated by the invention at any time prior to use providing the blend of aluminum powder in the composition conforms to the parameters described herein.

The following examples are illustrative of the invention and are not intended to be limiting. It is evident to one skilled in the art that the ingredients of the various compositions illustrated (e.g., their relative proportions and amounts), as well as other variables and parameters, can be modified while being within the scope and contemplation of the invention.

EXAMPLE 1

A chromate/phosphate binder was prepared of the type described in '251 Allen according to the following formula:

| | Binder A |
|---|---|
| 3200 gm | Deionized water |
| 1525 gm | Phosphoric acid, 85% |
| 350 gm | Chromic acid |
| 300 gm | Magnesium oxide |

A preferred embodiment of the bimodal aluminum-filled ceramic coatings disclosed herein was then prepared according to the following proportions:

| | |
|---|---|
| 385 gm | Binder A |
| 430 gm | Reducing gas-atomized spherical aluminum powder, Alcan X-75 ($\overline{ESD}$ = 38.1 $\mu$m) |
| 110 gm | Helium-atomized spherical aluminum powder, Valimet H-3 ($\overline{ESD}$ = 3.2 $\mu$m) |
| 10 gm | Fumed silica (Cab-O-Sil M-5) |
| 0.6 gm | Nonionic surfactant (Triton X100) |

The weight percentage of secondary powders in this formulation was 20% which was equal to that percentage which produced the maximum density in tap density tests. The ratio of average particle diameters was 0.08.

Ten two-inch by four inch panels of low carbon sheet steel and six, one-inch diameter, half-inch thick disks of 4130 steel were degreased in hot solvent and then grit blasted with 90-120 mesh alumina. Four coats of the bimodal coating were then sprayed onto these clean, blasted test specimens, producing 0.010-0.015 inch thick films. Each coat was cured one-half hour at 650° F. (343° C.). After the final coat was cured, three of the coated disks were heated at 1000° F. (580° C.) for 90 minutes by which time the aluminum-ceramic film had become electrically conductive. The electrical resistance of this postcured coating was only 2 ohms across a one-inch probe gap.

Six of the coated steel panels were lightly abraded with alumina grit after curing of the final coat. This burnishing operation also made the coatings on these panels electrically conductive. Three of these grit burnished panels were then topcoated with an aqueous chromate/phosphate sealer essentially consisting of binder A above and fine ceramic pigments (4-6 μm). The topcoat was also cured for one-half hour at 650° F. (343° C.).

The corrosion resistance of the bimodal coating was excellent when tested in 5% salt spray per ASTM B117, no matter what the condition of the coating film. The postcured coatings and the grit burnished coatings exhibited only slight quantities of white, sacrificial, corrosion products after 500 hours of exposure to the salt fog. There was no red rust on the panels, not even in scribe marks which had been cut through the coating to the surface of the panel.

After 500 hours in salt fog, there was no evidence of either red or white corrosion products on panels on which the bimodal coating had been grit burnished and sealed with the chromate/phosphate topcoat. Surprisingly, similar inactivity was observed on panels which had not been post treated in any way—even though the coatings had been scribed before being placed in the salt fog. The sacrificiality which prevented rust from forming in the scribe on these electrically non-conductive panels had heretofore been observed only in aluminum-filled chromate/phosphate coatings which had been thermally or mechanically post treated to achieve electrical conductivity.

Two of the grit burnished panels, one topcoated, one not, were also subjected to heat/salt cycling tests. In each cycle, the panels were heated in air for six hours at 750° F. (399° C.), cooled at room temperature for two hours, and then placed in a 5% salt fog (ASTM B117) for sixteen hours. Even after ten of these severe, combined oxidation and corrosion cycles, neither panel exhibited signs of rust or white sacrificial product though both had darkened slightly.

The coated one-inch diameter disks were used to determine the tensile bond strength of this bimodal coating in accordance with the method described in ASTM C633. Both sides of the disk were coated with an epoxy adhesive and it was sandwiched between the ends of two one-inch diameter rods, the other ends of which were threaded. The rods and disk were positioned in a fixture so that all were aligned along the same axis and the assembly was heated to cure the epoxy. When cooled, the ends of the rods were threaded into grips in a mechanical testing machine and the specimen was pulled apart at a rate of 0.10 inches per minute.

The average measured tensile bond strength of the three coated and cured disks was 9800 psi. Postcuring the coating at 1000° F. for 90 minutes reduced the bond strength to 9000 psi.

In addition to providing durable, oxidation and corrosion resistance to metal parts, this bimodal formulation could be used to repair or restore the surface finish of hardware. This capability was demonstrated on a badly pitted compressor blade from a gas ground turbine unit. Some pits on the airfoil surface of the blade were small (0.010 inches in diameter) but deep (0.080 inches). Others were shallow (0.015 inches) but wide (0.50+ inches in diameter).

The blade was blasted with clean 90-120 mesh grit at about 40 psi to remove all the corrosion deposits from the pitted areas. Then a coat of the bimodal slurry was spatulated onto the airfoil. This material was forced into the deep pits and smoothed over the shallow ones so that imperfections were completely filled. The coating was allowed to dry overnight at 175° F. (79° C.) before it was cured at 650° F. (343° C.).

After the cured coating had cooled, the airfoil surface was ground with a belt grinder to restore the blade contour. A second coat of the bimodal coating was sprayed on, cured and ground to produce a smooth, uniform surface. Finally, a coat of a material containing only fine aluminum (like Example 7 in '251 Allen) was applied, cured and polished. The result was complete restoration of the contour and finish of the airfoil surfaces of the pitted blade.

EXAMPLE 2

The coating in Example 1 was repeated, omitting the fumed silica and nonionic surfactant additions. Tensile bond strengths determined as in Example 1 were calculated to be approximately 9000 psi. Also, mild steel panels when coated with 10-15 mils of the coating showed no signs of corrosion after 500 hours of 5% salt spray exposure per ASTM B117.

EXAMPLE 3

The following thixotropic coating was prepared by mixing the ingredients in a high speed blender for 10 minutes:

| | | |
|---|---|---|
| 385 gm | Binder A | |
| 430 gm | Reducing gas-atomized spherical aluminum powder, Alcan X-75, 38.1 μm $\overline{ESD}$ | |
| 110 gm | Helium-atomized spherical aluminum powder, Valimet H-3, 3.2 μm $\overline{ESD}$ | |
| 27 gm | Strontium chromate | |
| 10 gm | Cab-O-Sil M-5 | |
| 0.6 gm | Triton X-100 | |

Coated mild steel specimens when placed in a beaker of tap water or 5% salt solution for 500 hours showed no signs of corrosion.

EXAMPLE 4

A thixotropic coating was prepared using only one type of aluminum powder pigment at a level that maintained the same pigment/binder solids ratio as the previous examples. The following ingredients were blended for 10 minutes:

| | |
|---|---|
| 385 gm | Binder A |
| 540 gm | Reducing gas-atomized spherical aluminum powder, Alcan X-75, 38.1 μm $\overline{ESD}$ |
| 10 gm | Cab-O-Sil M-5 |

-continued

| | |
|---|---|
| 0.6 gm | Triton X-100 |

Tensile bond strengths of the coating were determined per ASTM C633. The bond strength of the coating in an as cured condition averaged about 7200 psi. When the specimens were postcured at 1000° F. for four hours the tensile bond strength was determined to be about 6000 psi.

EXAMPLE 5

A thixotropic coating similar to Example 1 was made, substituting dispersible alumina for the fumed silica and nonionic surfactant additions. The formula is given as follows:

| | |
|---|---|
| 385 gm | Binder A |
| 480 gm | Reducing gas-atomized spherical aluminum powder, Alcan X-75, 38.1 $\mu$m $\overline{ESD}$ |
| 60 gm | Helium-atomized spherical aluminum powder, Valimet H-3, 3.2 $\mu$m $\overline{ESD}$ |
| 50 ml | 10% Dispural alumina dispersion in $H_3PO_3$ (made by mixing 6 ml 50% $H_3PO_3$, 444 ml water and 45 gm Dispural boehmite). |

Mild steel test panels coated with 10–15 mils of the coating showed excellent results when tested in salt spray, tap water immersion and salt water immersion for 500 hours.

EXAMPLE 6

Example 5 was repeated adding in addition 5 grams of fumed alumina.

Coated mild steel test panels were scribed with a one inch line through to the substrate. The specimens showed excellent corrosion resistance after 500 hours in 5% salt spray.

EXAMPLE 7

A coating similar to Example 1 was manufactured. Two air-atomized aluminum powders were used in place of the spherical powders of the first example. The following ingredients were mixed in a high shear blender:

| | |
|---|---|
| 385 gm | Binder A |
| 430 gm | Atomized aluminum powder, Alcan MD-101, 36 $\mu$m $\overline{ESD}$ |
| 110 gm | Atomized aluminum powder, Reynolds LSA-693, 5.5 $\mu$m $\overline{ESD}$ |
| 10 gm | Cab-O-Sil M5 |
| 0.6 gm | Triton X-100 |

Tensile bond strengths for the coating were determined to be approximately 7500 psi.

The superficial hardness of this coating can be increased by replacing all or part of the Reynolds LSA-693 aluminum with similarly sized particles of a hard refractory material such as silicon carbide (SiC) or a hard ceramic such as aluminum ($Al_2O_3$). Alternatively, a self-lubricating coating can be produced by substituting 5 $\mu$m particles of a lubricious solid such as polytetrafluoroethylene (PTFE) or molybdenum disulfide ($MOS_2$) for the Reynolds aluminum.

EXAMPLE 8

A coating was prepared using a binder composition of the type disclosed by Wydra (U.S. Pat. No. 3,857,717) and given by the following formula:

| Binder B | |
|---|---|
| 600 gm | Deionized water |
| 170 gm | Phosphoric acid |
| 110 gm | Phosphorous acid |
| 140 gm | Chromic acid |

The coating contained two aluminum powders in an optimum ratio with respect to tap density. It was mixed in a blender according to the following formula:

| | |
|---|---|
| 385 gm | Binder B |
| 400 gm | Reducing gas-atomized spherical aluminum powder, Alcan X-75, 38.1 um ESD |
| 80 gm | Helium-atomized spherical aluminum powder, Valimet H-5, 3.9 um ESD |

Mild steel test panels, when coated with 10 mils of the coating applied in four coats, each cured at 650° F., showed little or no change when immersed in tap water for extended periods of time.

EXAMPLE 9

Another binder with no added cation was prepared by mixing the following ingredients:

| Binder C | |
|---|---|
| 1200 gm | Deionized water |
| 215 gm | Phosphoric acid, 85% |
| 90 gm | Chromic acid |

A thixotropic coating composition was prepared according to the following:

| | |
|---|---|
| 385 gm | Binder C |
| 430 gm | Reducing gas-atomized spherical aluminum powder, Alcan X-75, 38.1 $\mu$m $\overline{ESD}$ |
| 110 gm | Reducing gas-atomized spherical aluminum powder, Alcan X-65, 8.9 $\mu$m $\overline{ESD}$ |
| Mix in blender for 10 minutes, than add: | |
| 10 gm | Fumed silica, Cab-O-Sil M5 |
| 0.6 gm | Triton X-100 |

The coating exhibited excellent resistance to long term 5% salt water immersion when tested on AISI 1010 steel panels at a thickness of 15 mils.

EXAMPLE 10

A binder composition similar to that used Example 1 was prepared, substituting zinc oxide for the magnesium oxide. Suitable zinc oxide was added to achieve a pH of 1.5. The binder (binder D) was used in the following coating composition:

| | |
|---|---|
| 400 gm | Binder D |
| 225 gm | Reducing gas-atomized spherical aluminum powder, Alcan X-81, 23.7 $\mu$m $\overline{ESD}$ |
| 110 gm | Atomized aluminum powder, Reynolds LSA693, 5.5 $\mu$m $\overline{ESD}$ |

When tested for 500 hours in 5% salt spray per ASTM B117, the coating had no signs of corrosion as applied on 1010 steel test panels at a thickness of 12 mils in four separately cured coats. The coating was cured at 650° F.

EXAMPLE 11

The following is an embodiment of the bimodal coatings discussed herein containing a secondary particle that is other than aluminum:

| | |
|---|---|
| 385 gm | Binder A from Example 1 |
| 280 gm | Spherical aluminum powder, Alcan X-75 ($\overline{ESD}$ - 38.1 μm) |
| 250 gm | Reduced nickel powder, INCO 123 ($\overline{ESD}$ = 5 μm) |
| 10 gm | Fumed silica (Cab-O-Sil M-5) |
| 0.6 gm | Nonionic surfactant (Triton X-100) |

This formulation was blended at high speed for 10 minutes. The thixotropic binder was used to retard settling of the much heavier nickel pigment. The added density (8.9 gm/cc) of the secondary nickel pigment also required that a greater weight had to be added to achieve the same effect as a 20% addition of similarly sized aluminum powder (density=2.7 gm/cc).

Other secondary powders, such as atomized iron, chromium or their alloys, can be substituted for or added to the nickel powder specified in this composition.

We claim:

1. A coated metal or coated ceramic part which exhibits improved salt corrosion and oxidation resistance, which part is coated with a cured coating composition or a cured binder which comprises phosphate ions and ions of the group of chromate or molybdate ions, and an atomized aluminum powder having an average particle size (as expressed in terms of the median equivalent spherical diameter ($\overline{ESD}$), that is greater than at least 15 μm, and having a size distribution such that at least about 5% of the particles by weight are retained on a 325 mesh screen.

2. The metal part of claim 1 which is a thick multilayer coating, each layer being from about 0.003 to about 0.030 inch thick.

3. The coated part of claim 1 wherein the particle size distribution of the aluminum has a single maximum, due to the presence of one or more grades of atomized powder, each having an $\overline{ESD}$ greater than 15 μm.

4. The coated part of claim 1 wherein the particle size distribution curve of the aluminum has a particle size distribution curve, which curve has two peak frequencies which are attributable to the presence of a mixture of larger particle size powder which has an average particle size greater than 15 μm and in which the size distribution is such that at least about 5% by weight of the particles are greater than 44 microns, and of at most 50 weight percent a mixture of smaller particle size powder, the two powders being in such ratio that the $\overline{ESD}$ of the smaller to the larger powder is less than 0.5, the average particle size ofthe powders being expressed in terms of the median eqivalent spherical diameter, $\overline{ESD}$.

5. The coated part of claim 1 wherein the weight percentage of the powder of smaller particle size is between 15 and 25 μm.

6. The coated part of claim 1 wherein the ratio of the $\overline{ESD}$ of the powder of smaller particle size to that of the larger particle size powder is less than 0.12.

7. The coated part of claim 1 wherein the ratio of the $\overline{ESD}$'s of powders of smaller and larger particle size is less than 0.12 and the weight percentage of the powder of smaller particle size is between 15 and 25.

8. The coated part of claim 1 wherein the particle size distribution curve has two distinct peak frequencies attributable to the presence of a powder with an $\overline{ESD}$ particle size greater than 15 μm and at most 50 weight percent of a small particle size powder, selected such that the ratio of the $\overline{ESD}$ of the later powder to that of the former powder is less than 0.5.

9. The metal part of claim 1 which is diesel engine turbocharger inlet housing.

10. The metal part of claim 1 which is an aircraft engine case.

11. The metal part of claim 1 which is a compressor case of an aircraft turbine engine.

12. The metal part of claim 1 which is a compressor blade or an aircraft turbine engine.

13. The metal part of claim 1 which has a ferrous surface.

14. The metal part of claim 1 the coating of which is at least about 0.100 inch thick.

15. The metal part of claim 1 which is abradable.

16. The coated part of claim 1 wherein the weight percentage of the powder of smaller particle size is between 15 and 25, the ratio of $\overline{ESD}$'s of the powder of smaller and larger particles size is less than 0.12 and the radius of the small particles is not greater than 0.22 times the radius of the larger particles.

17. The coated part of claim 16 wherein the average diameter of the smaller powder is at least about one-half of the average particle size of the particles of the larger particles of the powder.

18. The coated part of claim 17 wherein the relative weight ratio of the larger to the smaller particles of the powders is about 4 to 1.

19. The coated part of claim 18 wherein the average particle size of the smaller particles of the powder is at least about one-tenth of the average particle size of the larger particles of the powder.

20. The metal part of claim 1 wherein the aluminum powders are spherical powders.

21. The metal part of claim 20 wherein the spherical aluminum powders are air-atomized powders.

* * * * *